US010728620B2

(12) United States Patent
Witkowski et al.

(10) Patent No.: US 10,728,620 B2
(45) Date of Patent: Jul. 28, 2020

(54) CLOUD-BASED AUTOMATED CONTENT CURATION SYSTEM

(71) Applicant: Disney Enterprises, Inc., Burbank, CA (US)

(72) Inventors: Robert Witkowski, Valencia, CA (US); Bradley Wall, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/376,450

(22) Filed: Dec. 12, 2016

(65) Prior Publication Data

US 2018/0048938 A1  Feb. 15, 2018

Related U.S. Application Data

(60) Provisional application No. 62/372,647, filed on Aug. 9, 2016.

(51) Int. Cl.
| | |
|---|---|
| *H04N 21/4627* | (2011.01) |
| *H04N 21/4408* | (2011.01) |
| *H04N 21/6405* | (2011.01) |
| *H04N 21/643* | (2011.01) |
| *H04N 21/254* | (2011.01) |
| *H04N 21/44* | (2011.01) |

(52) U.S. Cl.
CPC ..... *H04N 21/4627* (2013.01); *H04N 21/2541* (2013.01); *H04N 21/44* (2013.01); *H04N 21/4408* (2013.01); *H04N 21/6405* (2013.01); *H04N 21/64322* (2013.01)

(58) Field of Classification Search
CPC .................. G06Q 50/184; G06Q 2220/18
See application file for complete search history.

(56) References Cited

U.S. PATENT DOCUMENTS

| | | | | |
|---|---|---|---|---|
| 2004/0103120 | A1* | 5/2004 | Fickle | G06Q 10/10 |
| 2008/0228578 | A1* | 9/2008 | Mashinsky | G06F 21/10 |
| | | | | 705/14.54 |
| 2010/0178030 | A1* | 7/2010 | Colby | H04N 5/782 |
| | | | | 386/291 |
| 2011/0271092 | A1* | 11/2011 | Brelay | G11B 27/005 |
| | | | | 713/150 |

(Continued)

*Primary Examiner* — Michael R Telan
(74) *Attorney, Agent, or Firm* — Farjami & Farjami LLP (57) ABSTRACT

A cloud-based automated content curation system includes a content curation platform having a hardware processor and a memory, a master control automation unit stored in the memory, and a web-based affiliate operations portal. The hardware processor is configured to execute the master control automation unit to receive content feeds from and business rules for each of multiple affiliate content providers, and to receive traffic log data and replacement content metadata for each of the affiliate content providers via the web-based affiliate operations portal. The hardware processor is also configured to execute the master control automation unit to curate multiple digital rights cleared content streams from each content feed based on the respective traffic log data, replacement content metadata, and business rules for each of the affiliate content providers, and to generate Internet Protocol (IP) transport streams for distributing the digital rights cleared content streams.

19 Claims, 5 Drawing Sheets

(56) References Cited

U.S. PATENT DOCUMENTS

| | | | |
|---|---|---|---|
| 2013/0064283 A1* | 3/2013 | Sun | H04N 21/2343 |
| | | | 375/240.01 |
| 2014/0033258 A1* | 1/2014 | Beals | H04H 20/63 |
| | | | 725/68 |
| 2014/0068648 A1* | 3/2014 | Green | H04N 21/4394 |
| | | | 725/18 |
| 2014/0304757 A1* | 10/2014 | Elm | H04N 21/2665 |
| | | | 725/116 |

\* cited by examiner

CLOUD-BASED AUTOMATED CONTENT CURATION SYSTEM

RELATED APPLICATION(S)

The present application claims the benefit of and priority to a Provisional Patent Application Ser. No. 62/372,647, filed Aug. 9, 2016, and titled "Automated Content Curation in the Cloud Using a Web-Based Collaboration Portal," which is hereby incorporated fully by reference into the present application.

BACKGROUND

Consumers of television (TV) program content now have a level of control over when, where, and how they will consume their programming of choice that was simply unavailable to previous generations of TV viewers. For example, the ever-increasing variety of program content available online has enabled consumers to selectively access TV program content using a personal computer (PC), such as a laptop or tablet computer, rather than through use of a traditional TV set when at home, or through use of a mobile communication device while traveling or otherwise away from home.

The increased viewing options for consumers of TV program content have created significant challenges for content providers attempting to assure viewer loyalty while ensuring digital rights compliance. For example, distribution rights covering delivery of program content over a particular distribution channel, such as a linear TV broadcast, may not cover digital distribution of the same program content over the Internet. However, conventional approaches to converting a linear TV content feed into a digital content stream for which digital distribution rights are in place are typically burdensome, costly, and often require human involvement or direction. Consequently, there is a need in the art for a solution enabling the substantially automated curation of digitally rights cleared content for distribution over the Internet.

SUMMARY

There are provided systems and methods for performing cloud-based automated content curation, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

As noted above, the increased viewing options for consumers of television (TV) program content enabled by advances in technology have created significant challenges for content providers attempting to assure viewer loyalty while ensuring digital rights compliance. For example, there may be types of content included in a linear TV broadcast for which the TV broadcaster does not have Internet distribution rights. As a specific example, Internet distribution rights for many sporting events are typically controlled by the sports league or team, rather than a TV broadcaster.

The present application is directed to a cloud-based solution configured to automate content curation using a web-based operations portal accessible by a broadcast affiliate, to ensure that digital content is appropriately distributed for display to viewers. The present application discloses a novel solution by which fully conditioned Internet Protocol (IP) transport streams including digital television or other digital video content can be created in a virtual environment through collaboration between national and local programming providers. The cloud-based automated content curation solution disclosed herein may include two distinct but interrelated parts, a content curation platform including a master control automation unit and a web-based affiliate operations portal, which are further described below by reference to the figures of the present application.

Figure 1:
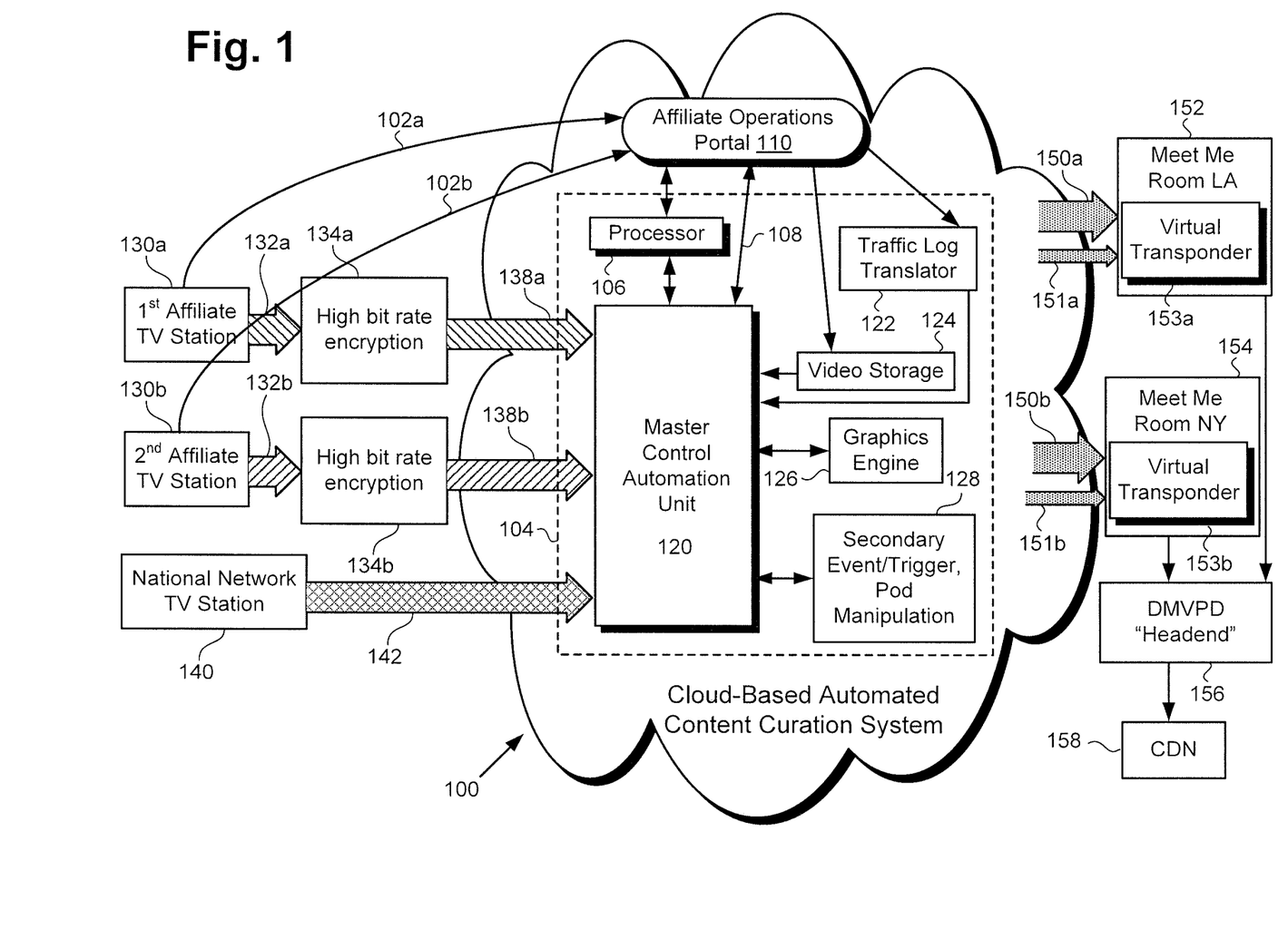
FIG. 1 shows a diagram of a cloud-based automated content curation system, according to one exemplary implementation.

FIG. 1 shows a diagram of cloud-based automated content curation system 100, according to one exemplary implementation. As shown in FIG. 1, cloud-based automated content curation system 100 includes content curation platform 104 and web-based affiliate operations portal 110. Content curation platform 104 includes hardware processor 106, and a memory (not explicitly shown in FIG. 1) storing master control automation unit 120, traffic log translator 122, video storage 124, graphics engine 126, and secondary/event trigger and pod manipulation module 128. As further shown in FIG. 1, web-based affiliate operations portal 110 is interactively linked to master control automation unit 120 via network communication link 108.

According to the present exemplary implementation, cloud-based content curation system 100 is utilized in a content distribution environment including first affiliate content provider 130a providing content feed 132a, second affiliate content provider 130b providing content feed 132b, and national network content provider 140 providing transmission 142, which may be a high bit rate encrypted transmission. It is noted that according to the exemplary implementation shown in FIG. 1, national network content provider 140 is represented as a national network TV station, while first and/or second affiliate content providers 130a and 130b may be TV stations affiliated with the national network TV station but broadcasting content feeds 132a and 132b to respective local audiences. In other words, one or both of content feeds 132a and 132b may be TV broadcast feeds.

The exemplary content distribution environment in which cloud-based content curation system 100 is utilized also includes high bit rate encryption services 134a and 134b producing high bit rate encrypted content feeds 138a and 138b from respective content feeds 132a and 132b. Also shown in FIG. 1 are network communication links 102a and 102b, IP transport streams 150a and 150b, which may be Mezzanine Multicast IP transport streams, as known in the art, and out-of-band program metadata 151a and 151b. In addition, FIG. 1 shows Los Angeles based Meet Me Room 152 including virtual transponder 153a, New York based Meet Me Room 154 including virtual transponder 153b, Digital Multi-channel Video Programming Distributor (DM-VPD) "headend" 156, and content delivery network (CDN) 158.

Cloud-based automated content curation system 100 is configured to receive content feeds 132a and 132b, either directly from first and second affiliate content providers 130a and 130b, or via high bit rate encryption services 134a and 134b as high bit rate encrypted content feeds 138a and 138b. In addition, cloud-based automated content curation system 100 may be configured to receive high bit rate encrypted transmission 142 directly from national network content provider 140.

Cloud-based automated content curation system 100 is further configured to enable one or both of first and second affiliate content providers 130a and 130b to collaborate in generating fully conditioned IP transport streams 150a and 150b (hereinafter "Mezzanine Multicast IP transport streams 150a and 150b") for distribution of digitally rights cleared content streams to CDN 158. That digitally rights cleared content may then be delivered to end-users, such as consumers of TV program content available online.

Figure 2:
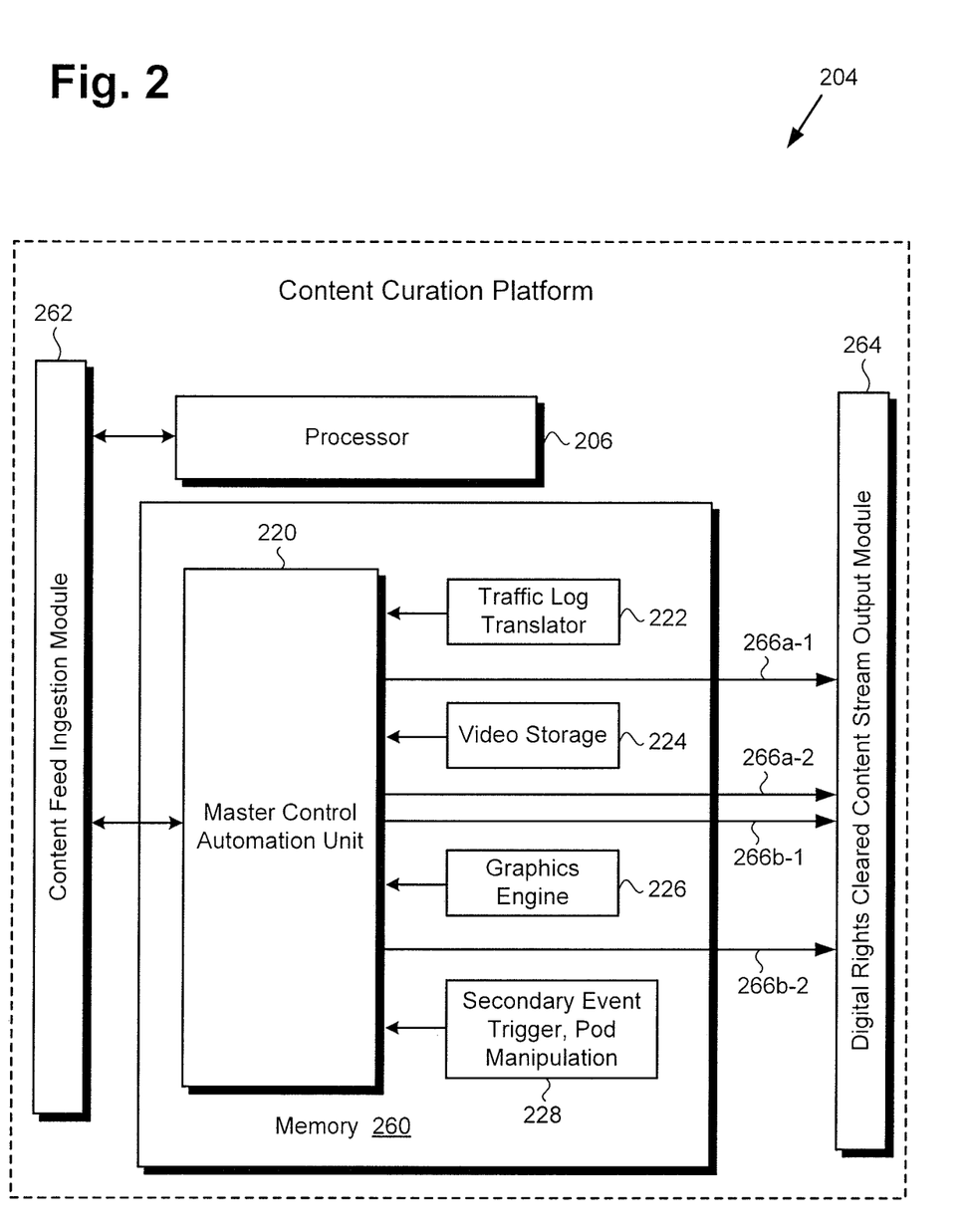
FIG. 2 shows a diagram of an exemplary content curation platform suitable for use in a cloud-based automated content curation system, according to one implementation.

FIG. 2 shows a diagram of exemplary content curation platform 204 suitable for use in cloud-based automated content curation system 100, according to one implementation. As shown in FIG. 2, content curation platform 204 includes hardware processor 206, and memory 260 storing master control automation unit 220, traffic log translator 222, video storage 224, graphics engine 226, and secondary/event trigger and pod manipulation module 228. Also shown in FIG. 2 are content feed ingestion module 262, digital rights cleared content stream output module 264, and digital rights cleared content streams 266a-1, 266a-2, 266b-1, and 266b-2.

Content curation platform 204 including hardware processor 206 and memory 260 corresponds in general to content curation platform 104 including hardware processor 106, in FIG. 1, and may share any of the characteristics attributed to that corresponding feature in the present application. Moreover, master control automation unit 220, in FIG. 2, corresponds in general to master control automation unit 120, in FIG. 1, and may share any of the characteristics attributed to that corresponding feature in the present application. That is to say, like master control automation unit 120, in FIG. 1, master control automation unit 220 is interactively linked to a web-based affiliate operations portal corresponding to web-based affiliate operations portal 110 but not shown in FIG. 2.

In addition, traffic log translator 222, video storage 224, graphics engine 226, and secondary/event trigger and pod manipulation module 228, in FIG. 2, correspond respectively in general to traffic log translator 122, video storage 124, graphics engine 126, and secondary/event trigger and pod manipulation module 128, in FIG. 1, and may share any of the characteristics attributed to those corresponding features in the present application.

It is noted that although FIG. 2 depicts master control automation unit 220, traffic log translator 222, video storage 224, graphics engine 226, and secondary/event trigger and pod manipulation module 228 as being mutually co-located in memory 260, that representation is merely provided as an aid to conceptual clarity. More generally, cloud-based automated content curation system 100 may include one or more content curation platforms 104/204, such as computer servers for example, which may be co-located, or may form an interactively linked but distributed system.

As a result, hardware processor 106/206 and memory 260 may correspond to distributed processor and memory resources within cloud-based automated content curation system 100. Thus, it is to be understood that master control automation unit 120/220, traffic log translator 122/222, video storage 124/224, graphics engine 126/226, and secondary/event trigger and pod manipulation module 128/228 may be stored remotely from one another within the distributed memory resources of cloud-based automated content curation system 100.

Figure 3:
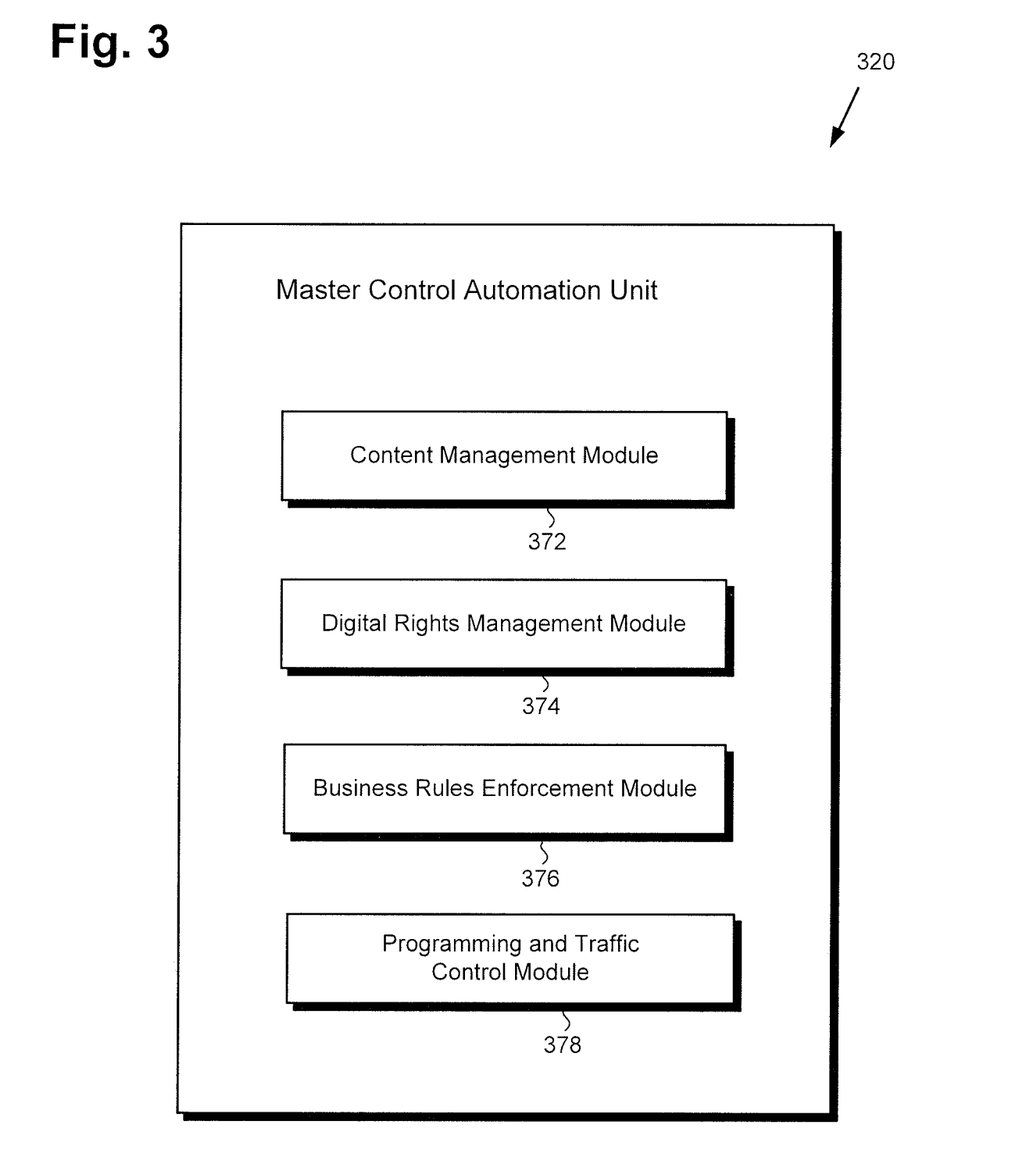
FIG. 3 shows a diagram of an exemplary master control automation unit of the exemplary content curation platform of FIG. 2, according to one implementation.

FIG. 3 shows a diagram of exemplary master control automation unit 320, according to one implementation. As shown in FIG. 3, example master control automation unit 320 includes content management module 372, digital rights management module 374, business rules enforcement module 376, and programming and traffic control module 378. Master control automation unit 320 corresponds in general to master control automation unit 120/220, in FIG. 1/2, and those corresponding features may share any of the characteristics attributed to any one of those corresponding features in the present application.

It is noted that, although not explicitly shown in FIG. 3, in some implementations, each of content management module 372, digital rights management module 374, business rules enforcement module 376, and programming and traffic control module 378 can be interactively linked to each other. Moreover, in at least one implementation, content management module 372, digital rights management module 374, business rules enforcement module 376, and programming and traffic control module 378 can be interactively linked to a web-based affiliate operations portal, such as web-based affiliate operations portal 110, in FIG. 1.

Figure 4:
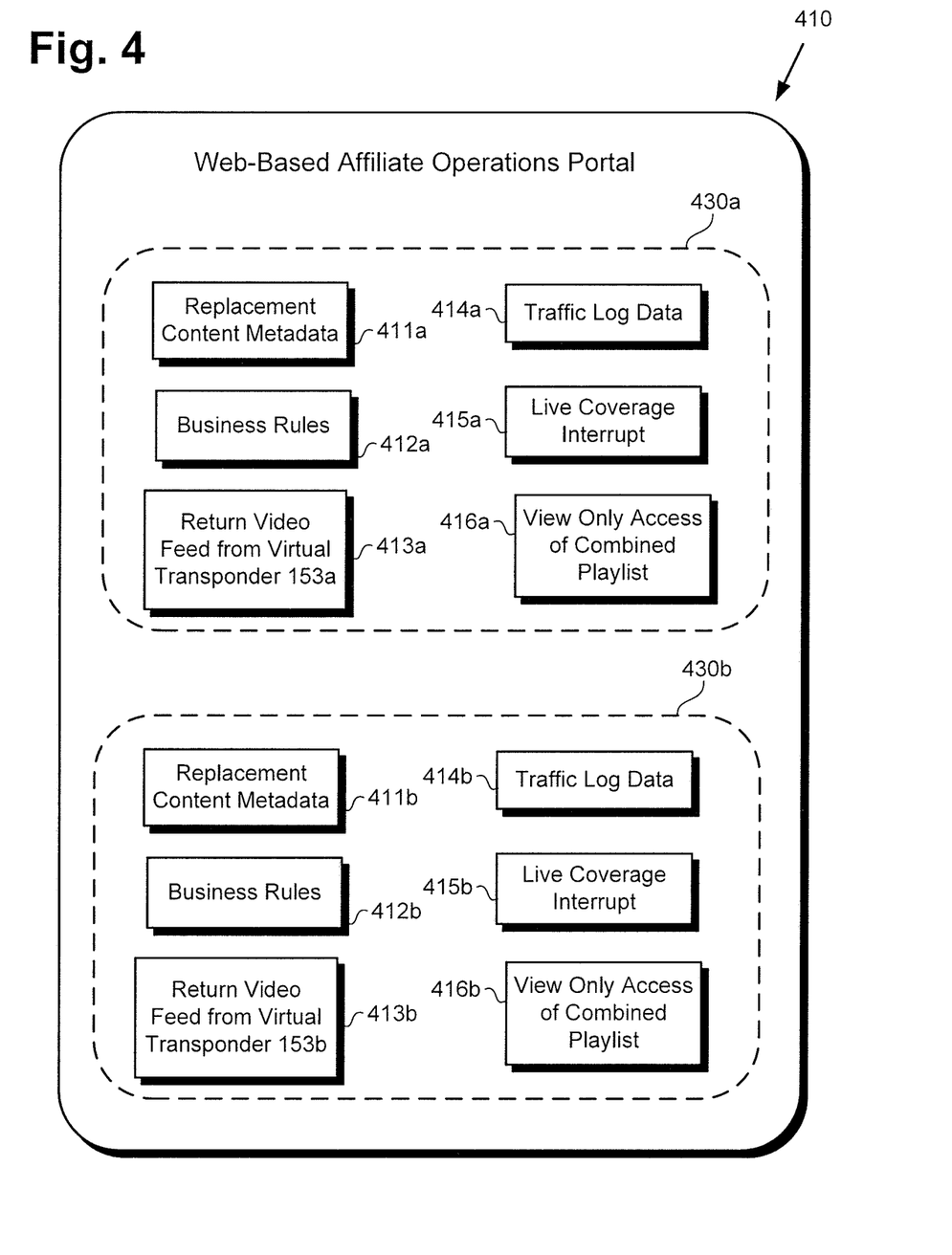
FIG. 4 shows a diagram of an exemplary web-based affiliate operations portal suitable for use in a cloud-based automated content curation system, according to one implementation.

FIG. 4 shows a diagram of exemplary web-based affiliate operations portal 410, according to one implementation. As shown in FIG. 4, web-based affiliate operations portal 410 provides first and second individual affiliate operations portals 430a and 430b, corresponding respectively to first and second affiliate content providers 130a and 130b, in FIG. 1. In other words, web-based affiliate operations portal 410 includes first individual affiliate operations portal 430a for use by first affiliate content provider 130a, and second individual affiliate operations portal 430b for use by second affiliate content provider 130b.

It is noted that although the implementations shown by FIG. 1 and FIG. 4 depict two affiliate content providers 130a and 130b, and two individual affiliate operations portals 430a and 430b, that simplified representation is presented merely in the interests of conceptual clarity. More generally, the content distribution environment in which cloud-based automated content curation system 100 is utilized may include tens, hundreds, or thousands of affiliate content providers corresponding to first and second affiliate content providers 130a and 130b. Accordingly, in such use cases, web-based affiliate operations portal 410 may include tens, hundreds, or thousands of individual affiliate operations portals, each of which may be used exclusively by a respective one affiliate content provider, for example.

As shown in FIG. 4, each of first and second individual affiliate operations portals 430a and 430b may include replacement content metadata, business rules, a virtual transponder return video feed, and traffic log data. Thus, first individual affiliate operations portal 430a may include replacement content metadata 411a, business rules 412a for first affiliate content provider 130a, return video feed 413a from virtual transponder 153a, and traffic log data 414a. In addition, second individual affiliate operations portal 430b may include replacement content metadata 411b, business rules 412b for second affiliate content provider 130b, return video feed 413b from virtual transponder 153b, and traffic log data 414b.

As further shown in FIG. 4, either or both of first and second affiliate content providers 130a and 130b may submit respective live coverage interrupt request 415a and/or 415b via its respective individual affiliate operations portal 430a or 430b. In addition, either or both of first and second affiliate content providers 130a and 130b may have view only access 416a and/or 416b of the combined playlists included in respective digitally rights cleared content streams 266a-1/266a-2 and/or 266b-1/266b-2 via its respective individual affiliate operations portal 430a or 430b. Web-based operations portal 410 corresponds in general to web-based operations portal 110, in FIG. 1, and those corresponding features may share any of the characteristics attributed to either feature in the present application.

The features shown in FIGS. 1-4 of the present application will be further described by reference to FIG. 5, which presents flowchart 500 outlining an exemplary method for performing cloud-based automated content curation, according to one implementation. With respect to the method outlined in FIG. 5, it is noted that certain details and features have been left out of flowchart 500 in order not to obscure the discussion of the inventive features in the present application.

Figure 5:
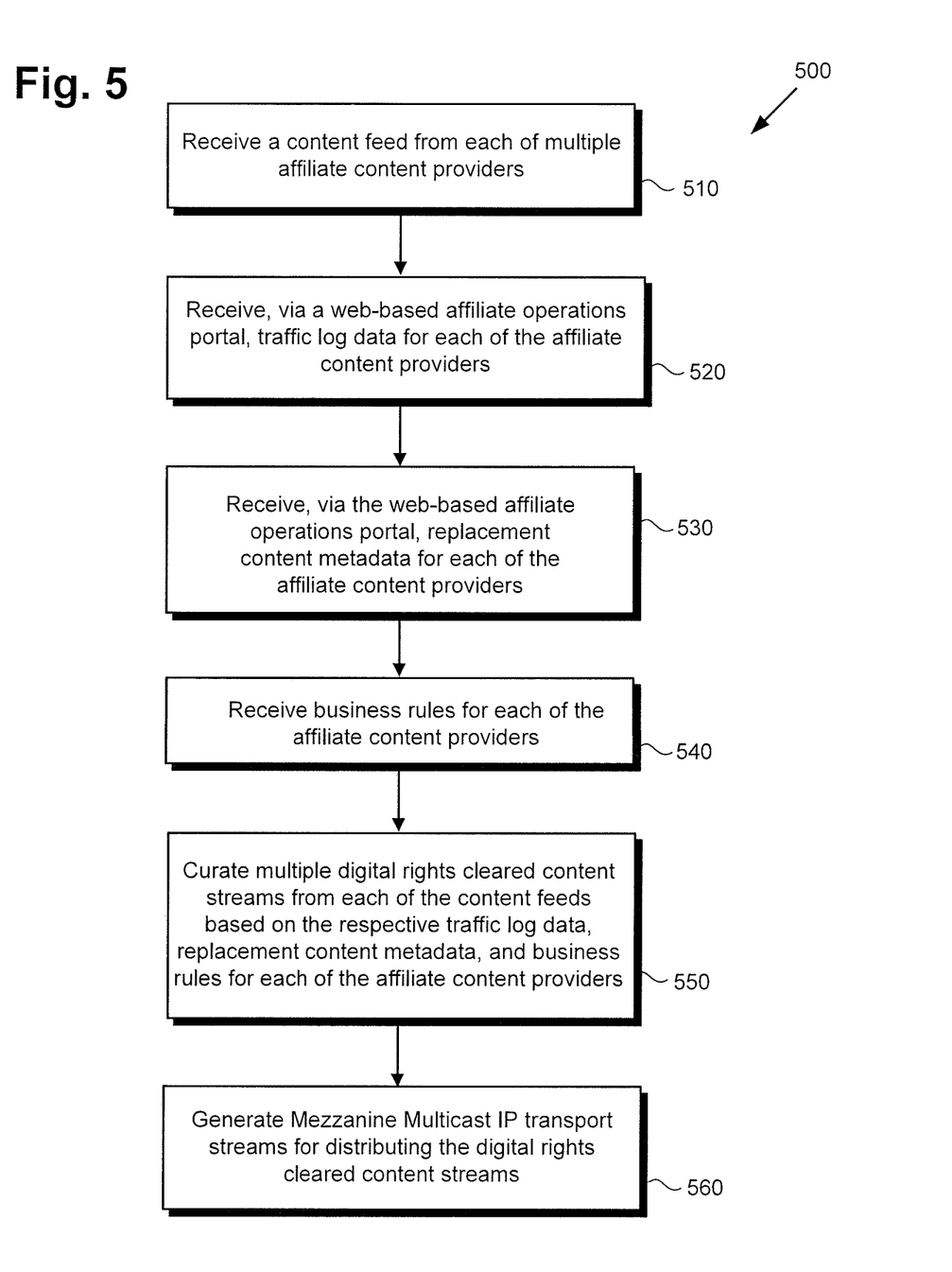
FIG. 5 shows a flowchart presenting an exemplary method for performing cloud-based automated content curation, according to one implementation.

Referring to FIG. 5 in combination with FIGS. 1 and 2, flowchart 500 begins with receiving content feeds 132a and 132b from respective first and second affiliate content providers 130a and 130b (action 510). Content feeds 132a and 132b may be received, either directly or as high bit rate encrypted content feeds 138a and 138b, by master control automation unit 120/220/320 of cloud-based automated content curation system 100, executed by hardware processor 106/206.

As a specific example, first affiliate content provider 130a may be a local Los Angeles based content provider corresponding to affiliate KXYZ-TV of a New York based parent station of the XYZ Broadcasting Company and depicted as national network content provider 140. Moreover, second affiliate content provider 130b may be a local Buffalo based content provider corresponding to affiliate WKBXYZ-TV of the XYZ Broadcasting Company.

According to the exemplary implementation shown in FIG. 1, first affiliate content provider 130a and second affiliate content provider 130b provide respective content feeds 132a and 132b for delivery into cloud-based automated content curation system 100. Depending upon the content contained in content feeds 132a and 132b, the digital rights to that content acquired by first and second affiliate content providers 130a and 130b, and the respective capabilities of first and second affiliate content providers 130a and 130b, content feeds 132a and 132b may include triggers and/or digital rights cleared content. Triggers may take the form of digital or analog signals included in content feeds 132a and/or 132b to identify the start points and/or end points of content, which may include programming content, locations of ads or ad pods, or interstitial content, for example.

As a specific example, first affiliate content provider 130a may provide content feed 132a including content for which digital rights have been cleared, but without triggers. By contrast, second affiliate content provider 130b may provide content feed 132b including content for which digital rights have not been cleared, but which does include triggers. It is noted that other affiliate content providers (not shown in FIG. 1) may also provide feeds including digital rights cleared and/or digital rights uncleared content, and including or omitting triggers.

According to the present exemplary implementation, content feed 132a undergoes high bit rate encryption performed by high bit rate encryption service 134a and is ingested by content feed ingestion module 262 of master control automation unit 120/220/320 as high bit rate encrypted content feed 138a. Similarly, content feed 132b undergoes high bit rate encryption performed by high bit rate encryption service 134b and is ingested by content feed ingestion module 262 of master control automation unit 120/220/320 as high bit rate encrypted content feed 138b.

In addition to high bit rate encrypted content feeds 138a and 138b, content feed ingestion module 262 of master control automation unit 120/220/320 ingests high bit rate encrypted transmission 142 from national network content provider 140. It is noted that although FIG. 1 shows high bit rate encrypted content feeds 138a and 138b, and high bit rate encrypted transmission 142 from national network content provider 140 as originating outside cloud-based automated content curation system 100, that implementation is merely exemplary. In another implementation, high bit rate encrypted transmission 142 may be generated within cloud-based automated content curation system 100, while content feeds 132a and 132b may undergo high bit rate encryption within cloud-based automated content curation system 100.

Flowchart 500 continues with receiving, via web-based affiliate operations portal 110/410, traffic log data 414a and 414b for each of respective first and second affiliate content providers 130a and 130b (action 520). Traffic log data 414a and 414b may be received by programming and traffic control module 378 of master control automation unit 120/220/320, for example, executed by hardware processor 106/206.

For example, each of first and second affiliate content providers 130a and 130b may utilize web-based affiliate operations portal 110/410 to provide respective traffic log data 414a and 414b identifying its respective planned programming schedule for the next twenty-four hours, and may provide that data on a daily basis, for example. Due to the variety of formats in which traffic log data 414a and 414b may be delivered to cloud-based automated content curation system 100 via web-based affiliate operations portal 110/410, cloud-based automated content curation system 100 may include traffic log translator 122/222 to ensure that traffic log data 414a and 414b is provided to master control automation unit 120/220/320 in a consistent format.

Thus, in addition to providing content feeds 132a and 132b, respective first and second affiliate content providers 130a and 130b may utilize web-based affiliate operations portal 110/410, via respective network communication links 102a and 102b, to collaborate in the production of fully conditioned IP transport streams 150a and/or 150b. It is noted that cloud-based automated content curation system 100 may be designed so as to enable substantially concurrent use of web-based affiliate operations portal 110/410 by first and second affiliate content providers 130a and 130b. Moreover, and as noted above, the content distribution environment in which cloud-based automated content curation system 100 is utilized may include tens, hundreds, or thousands of affiliate content providers corresponding to first and second affiliate content providers 130a and 130b. In other words, cloud-based automated content curation system 100 may be designed to enable substantially concurrent use of web-based affiliate operations portal 110/410 by those tens, hundreds, or thousands of affiliate content providers.

Flowchart 500 continues with receiving, via web-based affiliate operations portal 110/410, replacement content metadata 411a and 411b for each of respective affiliate content providers 130a and 130b (action 530). Replacement content metadata 411a and 411b may be received by content management module 372 of master control automation unit 120/220/320, for example, executed by hardware processor 106/206.

In addition to providing traffic log data 414a and 414b, first and second affiliate content providers 130a and 130b may utilize web-based affiliate operations portal 110/410 to provide replacement content metadata 411a and 411b for use by master control automation unit 120/220/320 to identify replacement content for use as a substitute for content included in content feeds 132a or 132b but for which digital distribution rights have not been obtained. In addition, in some implementations first and second affiliate content providers 130a and 130b may provide the replacement content identified by replacement content metadata 411a and 411b to video storage 124/224 via web-based affiliate operations portal 110/410. It is noted that, in some implementations, replacement content metadata 411a and 411b may be included as part of in-band programming metadata distributed using respective Mezzanine Multicast IP transport streams 150a and 150b.

Flowchart 500 continues with receiving business rules 412a and 412b for each of respective first and second affiliate content providers 130a and 130b (action 540). Business rules 412a and 412b may be received by business rules enforcement module 376 of master control automation unit 120/220/320, for example, executed by hardware processor 106/206.

It is noted that, although the implementation shown by FIG. 4 depicts business rules 412a and 412b as being received via web-based affiliate operations portal 110/410, that representation is merely exemplary. In some implementations, business rules 412a and 412b for respective first and second affiliate content providers 130a and 130b may be received directly from first and second affiliate content providers 130a and 130b, or may be received from national network content provider 140.

Business rules 412a and 412b may be individualized for each of first and second affiliate content providers 130a and 130b, and may specify different strategies for responding to the presence of substantially the same content in content streams 132a and 132b. For example, if each of content streams 132a and 132b includes TV program "A" for which digital distribution rights are not held by either of first and second affiliate content providers 130a and 130b, business rules 412a may specify replacement of TV program "A" with replacement content identified by replacement content metadata 411a. By contrast, business rules 412b may specify that digital distribution rights be acquired if the cost of acquisition meets of falls below a predetermined cost threshold, but that TV program "A" be replaced with replacement content identified by replacement content metadata 411b if the cost of acquiring digital distribution rights is too high, i.e., exceeds the predetermined cost threshold.

Flowchart 500 continues with curating multiple digital rights cleared content streams from each of content feeds 132a and 132b based on respective traffic log data 414a and 414b, replacement content metadata 411a and 411b, and business rules 412a and 412b for each of first and second affiliate content providers 130a and 130b (action 550). Curation of the multiple digital rights cleared content streams from each of content feeds 132a and 132b may be performed by master control automation unit 120/220/320, executed by hardware processor 106/206, and using digital rights management module 374 in combination with business rules enforcement module 376.

For example, master control automation unit 120/220/320, executed by hardware processor 106/206, can curate digital rights cleared content streams 266a-1 and 266a-2, in FIG. 2, from content feed 132a based on traffic log data 414a, replacement content metadata 411a, and business rules 412a for first affiliate content provider 130a. In addition, master control automation unit 120/220/320, executed by hardware processor 106/206, can curate digital rights cleared content streams 266b-1 and 266b-2 from content feed 132b based on traffic log data 414b, replacement content metadata 411b, and business rules 412b for second affiliate content provider 130b.

Master control automation unit 120/220/320 may act on high bit rate encrypted content feeds 138a and 138b using replacement content and/or slates obtained from video storage 122/224, and/or graphics obtained from graphics engine 126/226, and/or instructions obtained from secondary event/trigger and pod manipulation module 128/228. In addition to providing replacement content metadata 411a and 411b, traffic log data 414a and 414b, and business rules 412a and 412b, in some implementations, first and second affiliate content providers 130a and 130b can observe the changes to respective content feeds 132a and 132b resulting from the automated actions performed by master control automation unit 120/220/320.

For example, and as shown in FIG. 4, first and second affiliate content providers 130a and 130b may utilize view only access 416a and 416b provided by their respective individual affiliate operations portals 430a and 430b to observe the changes to respective content feeds 132a and 132b. First and second affiliate content providers 130a and 130b may further utilize web-based affiliate operations portal 110/410 to request alternate changes to respective content feeds 132a and 132b, or to provide additional replacement content metadata and/or traffic log data and/or business rules.

As a result of the collaboration between first and second affiliate content providers 130a and 130b and master control automation unit 120/220/320 enabled by web-based affiliate operations portal 110/410, cloud-based automated content curation system 100 curates digital rights cleared content streams 266a-1 and 266a-2 from content feed 132a, and curates digital rights cleared content streams 266b-1 and 266b-2 from content feed 132b. That is to say, digital rights cleared content streams 266a-1 and 266a-2 may include digital rights cleared content originally provided in content feed 132a. In addition, digital rights cleared content streams 266a-1 and 266a-2 may include replacement content for which digital rights are cleared, or graphics, for example, as substitutes for content originally provided in content feed 132a but for which digital rights remain uncleared. Similarly, digital rights cleared content streams 266b-1 and 266b-2 may include digital rights cleared content originally provided in content feed 132b, and may also include replacement content for which digital rights are cleared, or graphics, for example, as substitutes for content originally provided in content feed 132b but for which digital rights remain uncleared.

In some implementations, hardware processor 106/206 may be further configured to execute master control automation unit 120/220/320 to receive, via web-based affiliate operations portal 110/410, live coverage interrupt request 415a and/or 415b from respective first and second affiliate content providers 130a and/or 130b. Live coverage interrupt requests 415a and 415b may be provided by respective first and second affiliate content providers 130a and 130b to indicate that there is an emergency broadcast, or a breaking or live news event that takes priority over planned programming included in respective traffic log data 414a and 414b.

Master control automation unit 120/220/320, executed by hardware processor 106/206, may modify digital rights cleared content streams 266a-1 and 266a-2 curated from content feed 132a based on live coverage interrupt request 415a. Similarly, master control automation unit 120/220/320, executed by hardware processor 106/206, may modify digital rights cleared content streams 266b-1 and 266b-2 curated from content feed 132b based on live coverage interrupt request 415b. Moreover, in some implementations, modifying digital rights cleared content streams 266a-1 and 266a-2 and/or digital rights cleared content streams 266b-1 and 266b-2 may be performed substantially in real time with respect to receiving live coverage interrupt requests 415a and/or 415b.

Cloud-based automated content curation system 100 may be designed so as to enable substantially concurrent curation of digital rights cleared content streams 266a-1, 266a-2, 266-b1, and 266b-2. Moreover, and as noted above, the content distribution environment in which cloud-based automated content curation system 100 is utilized may include tens, hundreds, or thousands of affiliate content providers corresponding to first and second affiliate content providers 130a and 130b. Thus, cloud-based automated content curation system 100 may be designed to enable substantially concurrent curation of multiple digital rights cleared content streams from each of the content streams provided by those tens, hundreds, or thousands of affiliate content providers.

Flowchart 500 can conclude with generating IP transport streams, such as Mezzanine Multicast IP transport streams, for distributing digital rights cleared content streams 266a-1, 266a-2, 266-b1, and 266b-2 (action 560). Generation of the IP transport streams for distributing digital rights cleared content streams 266a-1, 266a-2, 266-b1, and 266b-2 may be performed by master control automation unit 120/220/320, executed by hardware processor 106/206.

Referring to FIG. 1, Mezzanine Multicast IP transport stream 150a may be provided as an output from cloud-based automated content curation system 100 for distributing digital rights cleared content streams 266a-1 and 266a-2, while Mezzanine Multicast IP transport stream 150b may be provided as an output from cloud-based automated content curation system 100 for distributing digital rights cleared content streams 266b-1 and 266b-2. It is noted that Mezzanine Multicast IP transport streams 150a and 150b are depicted using broad arrows to indicate that each of Mezzanine Multicast IP transport streams 150a and 150b may include multiple digital rights cleared content streams.

As shown in FIG. 1, Mezzanine Multicast IP transport stream 150a may provide an IP transport stream as an output from cloud-based automated content curation system 100 to Los Angeles based Meet Me Room 152, via virtual transponder 153a. Analogously, Mezzanine Multicast IP transport stream 150b may provide an IP transport stream as an output from cloud-based automated content curation system 100 to New York based Meet Me Room 154, via virtual transponder 153b. From Meet Me Rooms 152 and 154, transmissions corresponding to the IP transport streams provided by Mezzanine Multicast IP transport streams 150a and 150b may be forwarded to DMVPD headend 156 for further delivery to CDN 158.

It is noted that, in addition to serving as a transmission interface for distribution of Mezzanine Multicast IP transport streams 150a and 150b through respective Los Angeles based Meet Me Room 152 and New York based Meet Me Room 154, respective virtual transponders 153a and 153b may also serve as application programming interfaces (APIs) for communications into cloud-based content curation system 100. For example, virtual transponder 153a may be utilized to provide return video feed 413a via individual affiliate operations portals 430a, and/or may be used to request delivery of out-of-band programming metadata 151a. By analogy, virtual transponder 153b may be utilized to provide return video feed 413b via individual affiliate operations portals 430b, and/or may be used to request delivery of out-of-band programming metadata 151b.

Thus, the present application discloses a cloud-based solution configured to automate content curation using a web-based operations portal accessible by broadcast affiliates, to ensure that digital content is appropriately distributed for display to viewers over the Internet.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A cloud-based automated content curation system comprising:
   a content curation platform including a hardware processor and a memory;
   a master control automation unit stored in the memory;
   a web-based affiliate operations portal interactively linked to the master control automation unit for use by a plurality of collaborating affiliate content providers including a first affiliate content provider and a second affiliate content provider;
   the hardware processor configured to execute the master control automation unit to:
      receive, via the web-based affiliate operations portal, a plurality of content feeds each from a corresponding one of the plurality of collaborating affiliate content providers using the web-based affiliate operations portal to provide a plurality of digital rights cleared content streams;
      receive, via the web-based affiliate operations portal, traffic log data for each of the plurality of collaborating affiliate content providers;
      receive, via the web-based affiliate operations portal, replacement content metadata for each of the plurality of collaborating affiliate content providers;

receive, via the web-based affiliate operations portal, business rules for each of the plurality of collaborating affiliate content providers;

curate the plurality of digital rights cleared content streams using each of the plurality of content feeds received from the plurality of collaborating affiliate content providers, based on the respective traffic log data, replacement content metadata, and business rules for each of the plurality of collaborating affiliate content providers; and generate an Internet Protocol (IP) transport stream for distributing each of the curated plurality of digital rights cleared content streams;

wherein the web-based affiliate operations portal enables the first affiliate content provider to modify one or more of the curated plurality of digital rights cleared content streams during distribution of the plurality of digital rights cleared content streams, while providing view only access to the second affiliate content provider.

2. The cloud-based automated content curation system of claim 1, wherein the cloud-based automated content curation system is configured to enable substantially concurrent curation of the plurality of digital rights cleared content streams.

3. The cloud-based automated content curation system of claim 1, wherein the plurality of content feeds are encrypted.

4. The cloud-based automated content curation system of claim 1, wherein the plurality of content feeds are high bit rate content feeds.

5. The cloud-based automated content curation system of claim 1, wherein one or more of the plurality of collaborating affiliate content providers are TV stations affiliated with a national TV network but broadcasting to a local audience.

6. The cloud-based automated content curation system of claim 1, wherein the hardware processor is further configured to execute the master control automation unit to receive, via the web-based affiliate operations portal, a live coverage interrupt request from the affiliate content provider.

7. The cloud-based automated content curation system of claim 6, wherein the curated plurality of digital rights cleared content streams is modified based on the live coverage interrupt request.

8. The cloud-based automated content curation system of claim 7, wherein modifying the curated plurality of digital rights cleared content streams is performed substantially in real time with respect to receiving the live coverage interrupt request.

9. A method for use by a cloud-based automated content curation system including a content curation platform having a hardware processor and a memory storing a master control automation unit, and a web-based affiliate operations portal interactively linked to the master control automation unit for use by a plurality of collaborating affiliate content providers including a first affiliate content provider and a second affiliate content provider, the method comprising:

receiving, via the web-based affiliate operations portal by the master control automation unit executed by the hardware processor, a plurality of content feeds each from a corresponding one of the plurality of collaborating affiliate content providers using the web-based affiliate operations portal to provide a plurality of digital rights cleared content streams;

receiving, via the web-based affiliate operations portal by the master control automation unit executed by the hardware processor, traffic log data for each of the plurality of collaborating affiliate content providers;

receiving, via the web-based affiliate operations portal by the master control automation unit executed by the hardware processor, replacement content metadata for each of the plurality of collaborating affiliate content providers;

receiving, via the web-based affiliate operations portal by the master control automation unit executed by the hardware processor, business rules for each of the plurality of collaborating affiliate content providers;

curating, by the master control automation unit executed by the hardware processor, the plurality of digital rights cleared content streams using each of the plurality of content feeds received from the plurality of collaborating affiliate content providers, based on the respective traffic log data, replacement content metadata, and business rules for each of plurality of collaborating affiliate content providers; and generating, by the master control automation unit executed by the hardware processor, an Internet Protocol (IP) transport stream for distributing each of the curated plurality of digital rights cleared content streams;

wherein the web-based affiliate operations portal enables the first affiliate content provider to modify one or more of the curated plurality of digital rights cleared content streams during distribution of the plurality of digital rights cleared content streams, while providing view only access to the second affiliate content provider.

10. The method of claim 9 further comprises enabling substantially concurrent curation of the plurality of digital rights cleared content streams.

11. The method of claim 9, wherein the plurality of content feeds are encrypted.

12. The method of claim 9, wherein the plurality of content feeds are high bit rate content feeds.

13. The method of claim 9, wherein one or more of the plurality of collaborating affiliate content providers are TV stations affiliated with a national TV network but broadcasting to a local audience.

14. The method of claim 9, further comprising receiving, via the web-based affiliate operations portal by the master control automation unit executed by the hardware processor, a live coverage interrupt request from the first affiliate content provider.

15. The method of claim 14, wherein the curated plurality of digital rights cleared content streams is modified based on the live coverage interrupt request.

16. The method of claim 15, wherein modifying the curated plurality of digital rights cleared is performed substantially in real time with respect to receiving the live coverage interrupt request.

17. A cloud-based automated content curation system comprising:

a content curation platform including a hardware processor and a memory;

a master control automation unit stored in the memory;

a web-based affiliate operations portal interactively linked to the master control automation unit for use by a plurality of affiliate content providers;

the hardware processor configured to execute the master control automation unit to:

receive, via the web-based affiliate operations portal, a plurality of content feeds each from a corresponding one of the plurality of affiliate content providers using the web-based affiliate operations portal to provide a plurality of digital rights cleared content streams;

receive, via the web-based affiliate operations portal, traffic log data for each of the plurality of affiliate content providers;

receive, via the web-based affiliate operations portal, replacement content metadata for each of the plurality of affiliate content providers;

receive, via the web-based affiliate operations portal, business rules for each of the plurality of affiliate content providers;

curate the plurality of digital rights cleared content streams using each of the plurality of content feeds received from the plurality of affiliate content providers, based on the respective traffic log data, replacement content metadata, and business rules for each of the plurality of affiliate content providers; and generate an Internet Protocol (IP) transport stream for distributing each of the curated plurality of digital rights cleared content streams via a virtual transponder;

wherein, in addition to serving as a transmission interface for distribution of the curated plurality of digital rights cleared content streams, the virtual transponder also serves as an application programming interface (API) for communications into the cloud-based automated content curation system.

18. The cloud-based automated content curation system of claim 17, wherein the communications into the cloud-based automated content curation system via the virtual transponder comprise at least one return video feed.

19. The cloud-based automated content curation system of claim 17, wherein the communications into the cloud-based automated content curation system via the virtual transponder comprise at least one request for delivery of out-of-band programming metadata.

* * * * *

UNITED STATES PATENT AND TRADEMARK OFFICE
CERTIFICATE OF CORRECTION

PATENT NO. : 10,728,620 B2
APPLICATION NO. : 15/376450
DATED : July 28, 2020
INVENTOR(S) : Witkowski et al.

Page 1 of 1

It is certified that error appears in the above-identified patent and that said Letters Patent is hereby corrected as shown below:

In the Claims

Column 12, Line 18, Claim 9 "business rules for each of plurality" should be --business rules for each of the plurality--.

Signed and Sealed this
Twenty-ninth Day of December, 2020

Andrei Iancu
*Director of the United States Patent and Trademark Office*